(12) United States Patent
Maruyama

(10) Patent No.: US 6,834,810 B2
(45) Date of Patent: Dec. 28, 2004

(54) BENDABLE IC CARD AND ELECTRONIC APPARATUS HAVING CARD SLOT FOR INSERTING THE IC CARD

(75) Inventor: Takeshi Maruyama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 10/178,513

(22) Filed: Jun. 25, 2002

(65) Prior Publication Data

US 2002/0195500 A1 Dec. 26, 2002

(30) Foreign Application Priority Data

Jun. 26, 2001 (JP) ........................................ 2001-193417

(51) Int. Cl.⁷ .............................................. G06K 19/06
(52) U.S. Cl. ...................... 235/492; 235/487; 235/375; 235/380; 235/488; 235/491
(58) Field of Search .................... 235/492, 487, 235/375, 380, 488, 491; 361/737, 755

(56) References Cited

U.S. PATENT DOCUMENTS

| | | | | |
|---|---|---|---|---|
| 4,764,803 A | * | 8/1988 | Ueda | ........................... 257/679 |
| 5,031,026 A | * | 7/1991 | Ueda | ........................... 257/679 |
| 5,373,149 A | * | 12/1994 | Rasmussen | .................. 235/492 |
| 5,537,293 A | * | 7/1996 | Kobayashi et al. | .......... 361/737 |
| 5,975,420 A | | 11/1999 | Gogami et al. | |
| 6,069,795 A | * | 5/2000 | Klatt et al. | .................. 361/737 |
| 6,076,737 A | | 6/2000 | Gogami et al. | |
| 6,122,178 A | | 9/2000 | Andrews et al. | ............ 361/800 |
| 6,160,526 A | | 12/2000 | Hirai et al. | |
| 6,241,153 B1 | * | 6/2001 | Tiffany, III | .................. 235/488 |
| 6,447,314 B1 | * | 9/2002 | Kato et al. | ................... 439/165 |
| 6,572,022 B2 | * | 6/2003 | Suzuki | ........................ 235/492 |

FOREIGN PATENT DOCUMENTS

| | | | |
|---|---|---|---|
| EP | 0 610 025 A1 | 8/1994 | |
| EP | 0 661 617 A2 | 7/1995 | |
| EP | 0 710 059 A2 | 5/1996 | |
| JP | 07-073570 | 3/1995 | |
| JP | 10-283449 | 10/1998 | |
| JP | 10283449 A | * 10/1998 | ......... G06K/19/077 |
| JP | 11-001709 | 1/1999 | |
| JP | 11-034558 | 2/1999 | |

\* cited by examiner

*Primary Examiner*—Steven S. Paik
(74) *Attorney, Agent, or Firm*—Finnegan, Henderson, Farabow, Garrett & Dunner, L.L.P.

(57) ABSTRACT

An IC card has a first portion be inserted into a card slot, and a second portion outwardly projecting from the card slot when the first portion is inserted in the card slot. The first and second portions are coupled by a bendable coupling.

6 Claims, 5 Drawing Sheets

BENDABLE IC CARD AND ELECTRONIC APPARATUS HAVING CARD SLOT FOR INSERTING THE IC CARD

CROSS-REFERENCE TO RELATED APPLICATIONS

This application is based upon and claims the benefit of priority from the prior Japanese Patent Application No. 2001-193417, filed Jun. 26, 2001, the entire contents of which are incorporated by reference.

BACKGROUND OF THE INVENTION

1. Field of the Invention

This invention relates to an IC card, such as an SD (Secure Digital) card, used, for example, inserted in a card slot, and an electronic apparatus capable of inserting the IC card therein.

2. Description of the Related Art

In electronic apparatuses such as portable computers or PDAs (Personal Digital Assistants), IC cards based on PCMCIA are widely used as memory- or IO-expanding means. Recently, IC cards of this type have come to use a radio communication function such as Bluetooth (trademark) that enables radio data transmission between a plurality of electronic apparatuses.

An IC card having such a radio communication function is provided with a radio interface circuit or a card case housing an antenna. The card case comprises a first portion to be inserted into the card slot of a portable electronic apparatus, and a second portion outwardly projecting from the card slot when the card is inserted. The antenna for radio communication is housed in the second portion of the card case. Accordingly, when the IC card is inserted in the card slot, the antenna outwardly projects from the card slot. In this state, the radio transmission performance of the IC card can be maintained at a high level.

In the above-described conventional IC cards, since the second portion of the card case outwardly projects from the electronic apparatus, it is possible that a user may unintentionally press the second portion, or may place something on it. Thus, the application of an unintentional bending force to the second portion cannot be avoided.

Further, in the conventional IC cards, an electronic component such as an IC chip is housed in the card case. This electronic component is covered with a packaging resin more flexible than the card case.

In the above-described conventional structure, if a bending force is exerted on the IC card from the outside, the packaging resin is elastically deformed in accordance with the deformation of the card case, thereby absorbing the bending force applied to the electronic component. The packaging resin is more flexible and has a lower elasticity modulus than the card case. Therefore, even if the boundary between the packaging resin and electronic component is deformed in accordance with the deformation of the card case, the stress due to the deformation can be suppressed. As a result, the electronic component can be protected by the card case and packaging resin. Therefore, even if a bending force is exerted on the IC card, the electronic component will not immediately be damaged.

As described above, in the prior art, the bending force applied to the IC card is absorbed in the interior of the card case. However, if a strong bending force, which exceeds the stiffness of the card case, is exerted on the second portion of the IC card, the card case itself will be inevitably damaged. In this case, the interior of the IC card will be also damaged, i.e., the electronic component and antenna will be damaged.

BRIEF SUMMARY OF THE INVENTION

It is an object of the invention to provide an IC card of high bendability, which can immediately absorb an external force, such as a strong bending force, when it is exerted on its second portion.

It is another object of the invention to provide an electronic apparatus using the IC card.

To attain the objects, there is provided an IC card comprising: a first portion to be inserted into a card slot; and a second portion outwardly projecting from the card slot when the first portion is inserted in the card slot. The first and second portions are coupled to each other by a bendable coupling.

In this structure, when the IC card is inserted in the card slot, the second portion projects to the outside of the card slot. If an external force is exerted on the second portion to, for example, bend it, the coupling is bent in accordance with the direction in which the external force is exerted. As a result of the bending of the coupling, the external force exerted on the second portion is absorbed. Thus, the stress that occurs in the IC card because of the external force can be reduced, and the IC card can be prevented from being damaged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to FIGS. 1 to 7, a portable computer according to a first embodiment of the invention will be described.

Figure 1:
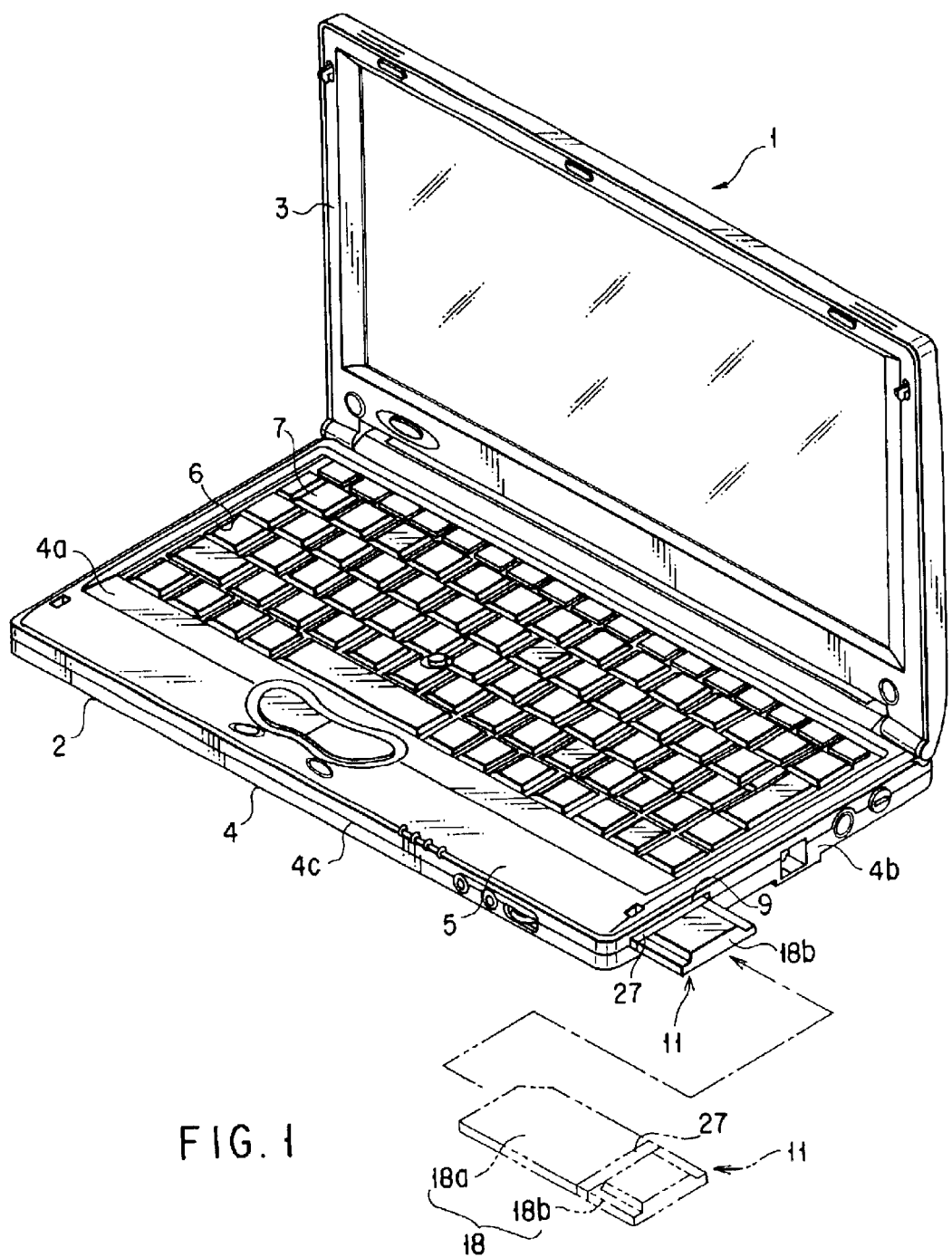
FIG. 1 is a perspective view of a first embodiment of the invention, illustrating an SD card is inserted in a card slot formed in the housing of a portable computer.

FIG. 1 shows a portable computer 1 as an electronic apparatus. The portable computer 1 comprises a main unit 2, and a display unit 3 supported by the main unit 2.

The computer main unit 2 includes a flat and box-shaped housing 4. The housing 4 includes an upper wall 4a, right and left sidewalls 4b, front wall 4c and a bottom (not shown). The upper wall 4a of the housing 4 has a palm rest 5 and keyboard attachment portion 6. The palm rest 5 forms the front edge portion of the housing 4. The keyboard attachment portion 6 is located behind the palm rest 5. A keyboard 7 is attached to the keyboard attachment portion 6.

The housing 4 has a card slot 9 formed in the right sidewall 4b. The card slot 9 is located at the right-hand side of the palm rest 5, and communicates with a card receptacle (not shown) provided in the housing 4.

Figure 2:
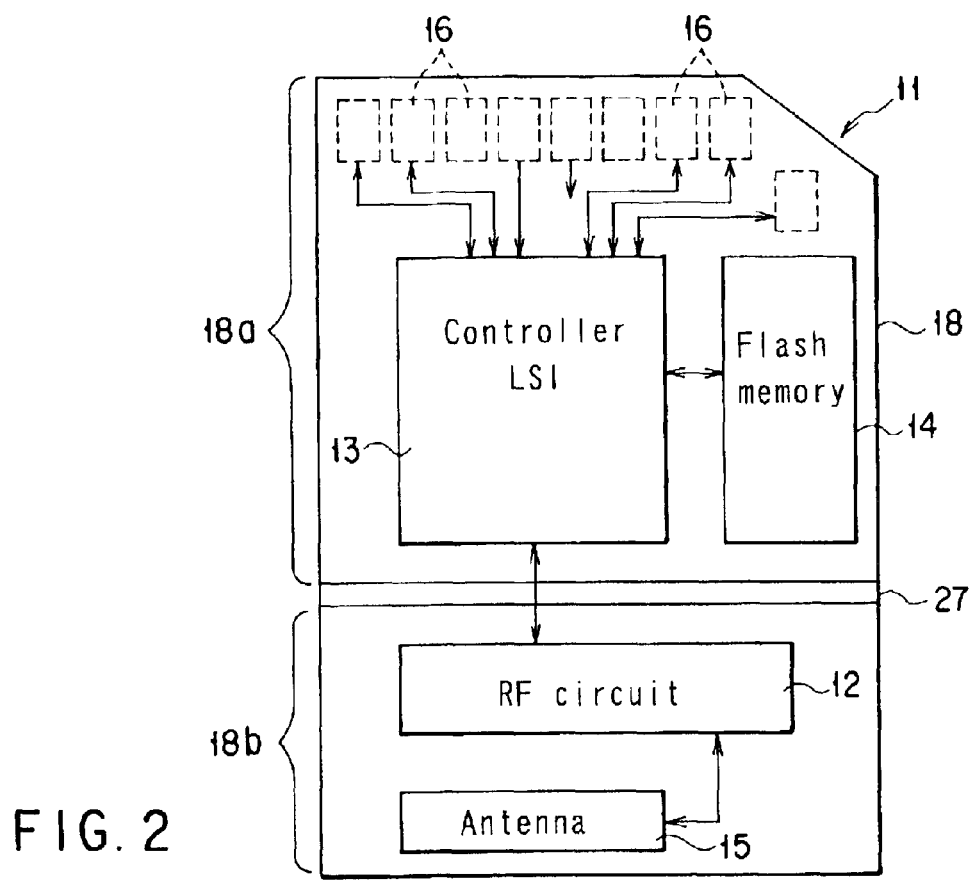
FIG. 2 is a block diagram illustrating the SD card according to the first embodiment.

As shown in FIG. 1, an SD card 11 as an IC card is removably inserted in the card slot 9. The SD card 11 has a radio communication function such as Bluetooth (trademark). As shown in FIG. 2, the SD card 11 contains an RF circuit 12, controller LSI 13, flash memory 14 and radio communication antenna 15. The RF circuit 12 is a high-frequency circuit for executing radio communication based on Bluetooth. The RF circuit 12 is electrically connected to the antenna 15 and controller LSI 13. The controller LSI 13 is electrically connected to the flash memory 14 and a plurality of connection terminals 16. The connection terminals 16 are arranged in line in the width direction of the SD card 11 at an end thereof. The antenna 15 is located at the other end of the SD card 11 opposite to the connection terminals 16.

The SD card 11 is inserted into the card receptacle through the card slot 9 from the end provided with the connection terminals 16. Accordingly, when the SD card 11 is inserted into the card receptacle through the card slot 9, the other end of the SD card 11 provided with the antenna 15 protrudes to the outside of the housing 4, thereby maintaining the radio signal transmission/reception efficiency at a high level.

Figure 5:
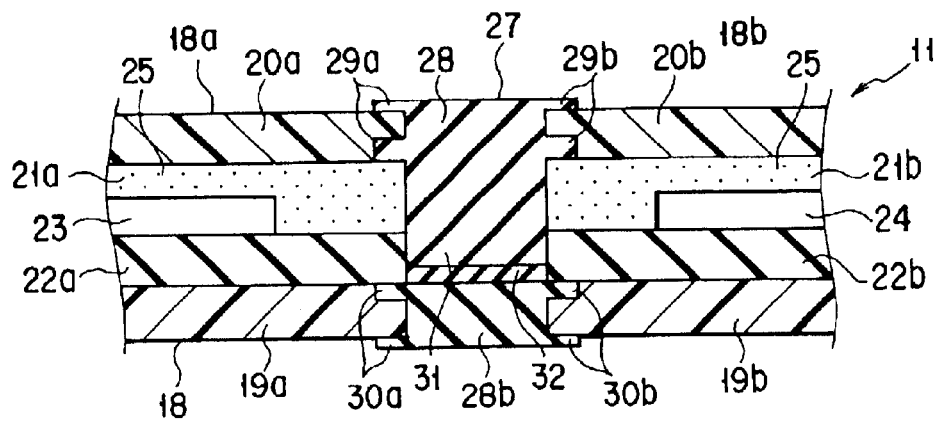
FIG. 5 is an enlarged sectional view illustrating the coupling of the SD card of the first embodiment.

As seen from FIGS. 1 and 5, the SD card 11 has a card case 18. The card case 18 is formed of a synthetic resin such as polycarbonate resin or ABS resin, and has a size substantially equal to, for example, a small stamp.

The card case 18 includes first and second potions 18a and 18b. The first portion 18a is to be inserted in the card slot 9 of the housing 4. The first portion 18a contains the controller LSI 13 and flash memory 14. The second portion 18b protrudes to the outside of the housing 4 when the card is inserted in the housing 4. The second portion 18b contains the RF circuit 12 and antenna 15.

As shown in FIG. 5, the first portion 18a of the card case 18 has a bottom 19a and upper wall 20a, which oppose each other and define a flat receiving chamber 21a within the first portion 18a. Similarly, the second portion 18b of the card case 18 has a bottom 19b and upper wall 20b, which oppose each other and define a flat receiving chamber 21b within the second portion 18b.

Rigid printed wiring boards 22a and 22b are received in the receiving chambers 21a and 21b, respectively. The printed wiring boards 22a and 22b are secured to the bottoms 19a and 19b, respectively. A plurality of electronic components 23 are mounted on the printed wiring board 22a in the receiving chamber 21a. The electronic components 23 provide the controller LSI 13 and flash memory 14. Other electronic components 24 are mounted on the printed wiring board 22b in the receiving chamber 21b. The electronic components 24 provide the RF circuit 12. Further, the spaces between the electronic components 23 and 24 in the receiving chambers 21a and 21b are filled with a synthetic resin filler 25.

Figure 4:
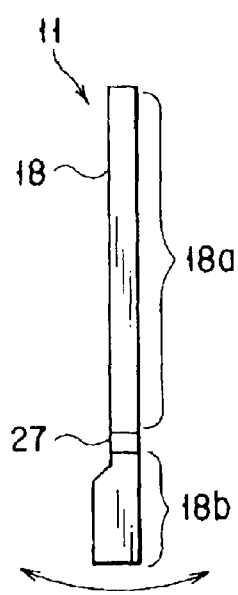
FIG. 4 is a side view illustrating the SD card according to the first embodiment.
Figure 3:
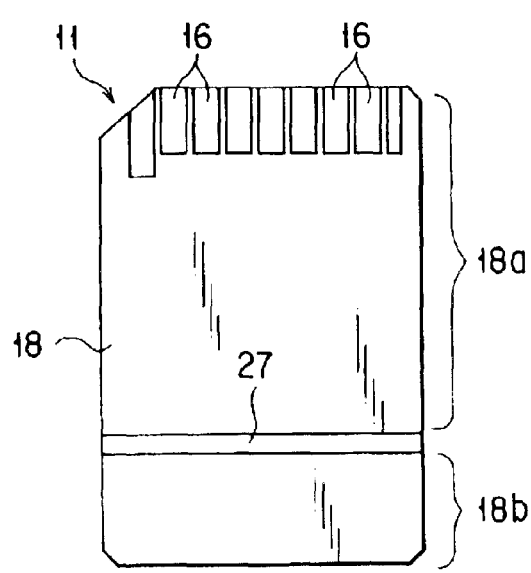
FIG. 3 is a plan view illustrating the SD card according to the first embodiment.

As seen from FIGS. 3 to 5, the card case 18 includes a coupling 27 as a third portion. The coupling 27 is interposed between the first and second portions 18a and 18b of the card case 18, and couples them together. The coupling 27 includes first and second elastic blocks 28a and 28b, which oppose each other in the thickness direction of the card case 18 and extend in the width direction of the same.

The first and second elastic blocks 28a and 28b are formed of, for example, an elastic material such as rubber. The elasticity modulus of the elastic blocks 28a and 28b is lower than that of the card case 18. The first elastic block 28a is located between the opposed ends of the upper walls 20a and 20b, and has a pair of first flanges 29a holding the end of the upper wall 20a therebetween, and a pair of second flanges 29b holding the end of the upper wall 20b therebetween. Thus, the first elastic block 28a is held between the opposed ends of the upper walls 20a and 20b.

Similarly, the second elastic block 28b is located between the opposed ends of the bottoms 19a and 19b, and has a pair of first flanges 30a holding the end of the bottom 19a therebetween, and a pair of second flanges 30b holding the end of the bottom 19b therebetween. Thus, the second elastic block 28b is held between the opposed ends of the bottoms 19a and 19b.

The first elastic block 28a has a projection 31 that projects toward the second elastic block 28b, and bridges the receiving chambers 21a and 21b. A slight space is interposed between the projection 31 and second elastic block 28b.

The first and second elastic blocks 28a and 28b have their respective intrinsic elastic forces. The first and second portions 18a and 18b of the card case 18 are held by the elastic forces of the elastic blocks 28a and 28b such that the portions are kept at the same level.

The printed wiring boards 22a and 22b received in the first and second portions 18a and 18b are electrically connected via a flexible wiring board 32. The flexible wiring board 32 is inserted in a gap g defined between the first and second elastic blocks 28a and 28b. Thus, the flexible wiring board 32 crosses the coupling 27.

As shown in FIG. 1, the SD card 11 is inserted, portion 18a facing the card slot 9 of the portable computer 1. As a result, the first portion 18a is received in the card receptacle of the housing 4, while the second portion 18b outwardly projects from the housing 4. In addition, the coupling 27 coupling the first and second portions 18a and 18b is exposed to the outside of the housing 4 through the card slot 9.

Figure 6:
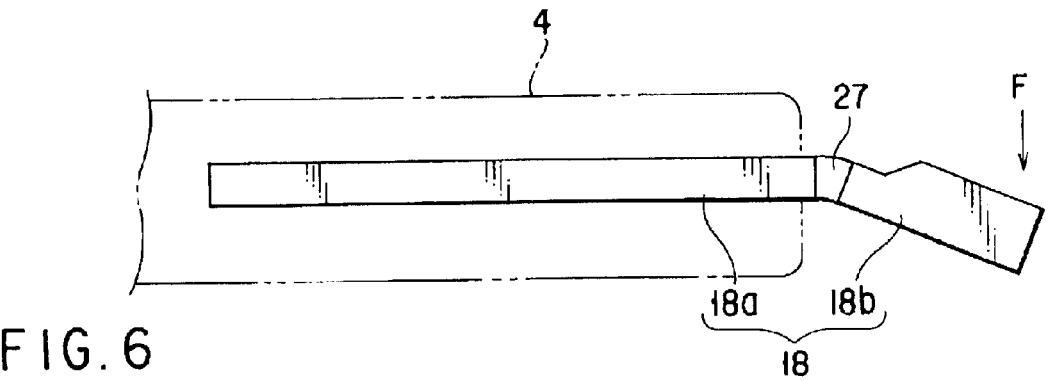
FIG. 6 is a side view of the SD card of the first embodiment, illustrating a state in which the second portion of the card case of the SD card is downwardly bent.
Figure 7:
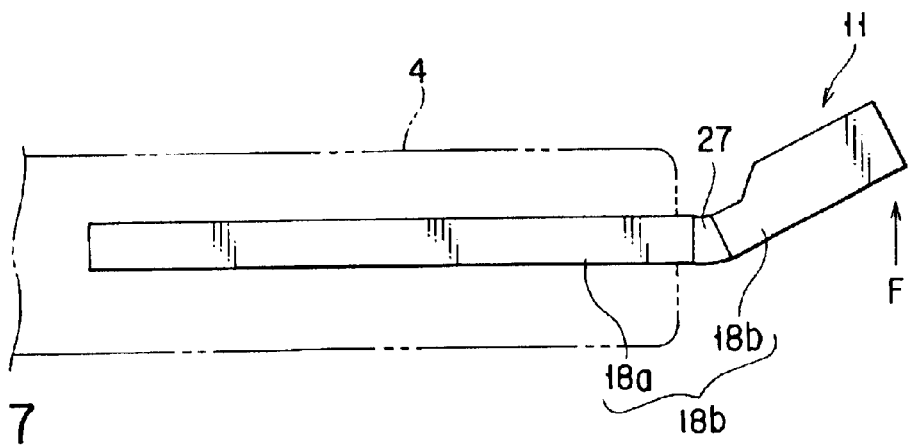
FIG. 7 is a side view of the SD card of the first embodiment, illustrating a state in which the second portion of the card case of the SD card is upwardly bent.

FIGS. 6 and 7 show respective states where the SD card 11 is inserted in the card slot 9 of the portable computer 1.

FIG. 6 shows a state in which an external downward force F is exerted on the second portion 18b of the card case 18. Similarly, FIG. 7 shows a state in which an external upward force F is exerted on the second portion 18b of the card case 18.

As is evident from FIGS. 6 and 7, when an external force F has been applied to the second portion 18b, the first and second elastic blocks 28a and 28b, which form the coupling 27, are elastically deformed in accordance with the magnitude and/or direction of the force. As a result, the SD card 11 is bent at the coupling 27 such that the second portion 18b of the card case 18 is bent in the direction in which the external force F is exerted. The deformation of the first and second elastic blocks 28a and 28b absorb the bending force applied to the second portion 18b of the card case 18.

Accordingly, even if an excessive external force F is exerted upon the second portion 18b of the card case 18, the resultant stress is reduced, which occurs at the card case 18 itself, and also at the printed wiring boards 22a and 22b and electronic components 23 and 24 housed in the card case 18. This means that the SD card 11 has a high resistance to a bending or deforming force, and is therefore free from damages caused by the force.

Further, the flexible wiring board 32 interposed between the first and second portions 18a and 18b of the card case 18 crosses the coupling 27. Therefore, if the second portion 18b of the card case 18 is bent, the flexible wiring board 32 is smoothly deformed in accordance with the deformation of the first and second elastic blocks 28a and 28b. As a result, the flexible wiring board 32 does not interrupt the deformation of the elastic blocks 28a and 28b.

When the external force F exerted upon the second portion 18b of the card case 18 is released, the first and second elastic blocks 28a and 28b are restored to their original shapes and positions. Accordingly, the first and second portions 18a and 18b of the card case 18 are restored to their original positions in which they are level with each other. Thus, the second portion 18b is not kept bent, and the SD card 11 restores its normal appearance.

The present invention is not limited to the above-described first embodiment. Referring now to FIGS. 8 to 14, a second embodiment will be described.

The second embodiment differs from the first embodiment only in the structure of a coupling 40 that couples the first and second portions 18a and 18b. The basic structure of the SD card 11 is similar between the first and second embodiments. Therefore, elements in the second embodiment similar to those of the first embodiment are denoted by corresponding reference numerals, and are not described.

Figure 9:
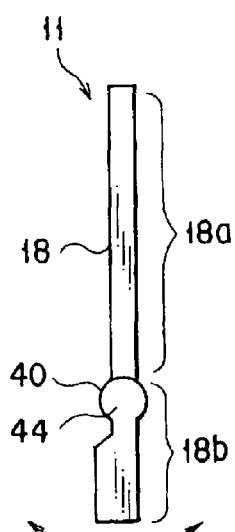
FIG. 9 is a side view illustrating the SD card according to the second embodiment.
Figure 8:
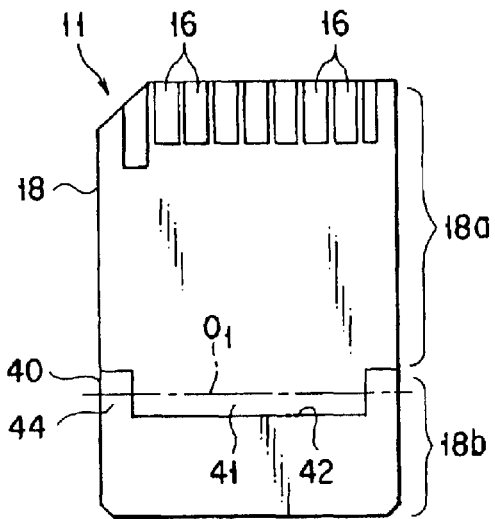
FIG. 8 is a plan view illustrating an SD card according to a second embodiment.
Figure 10:
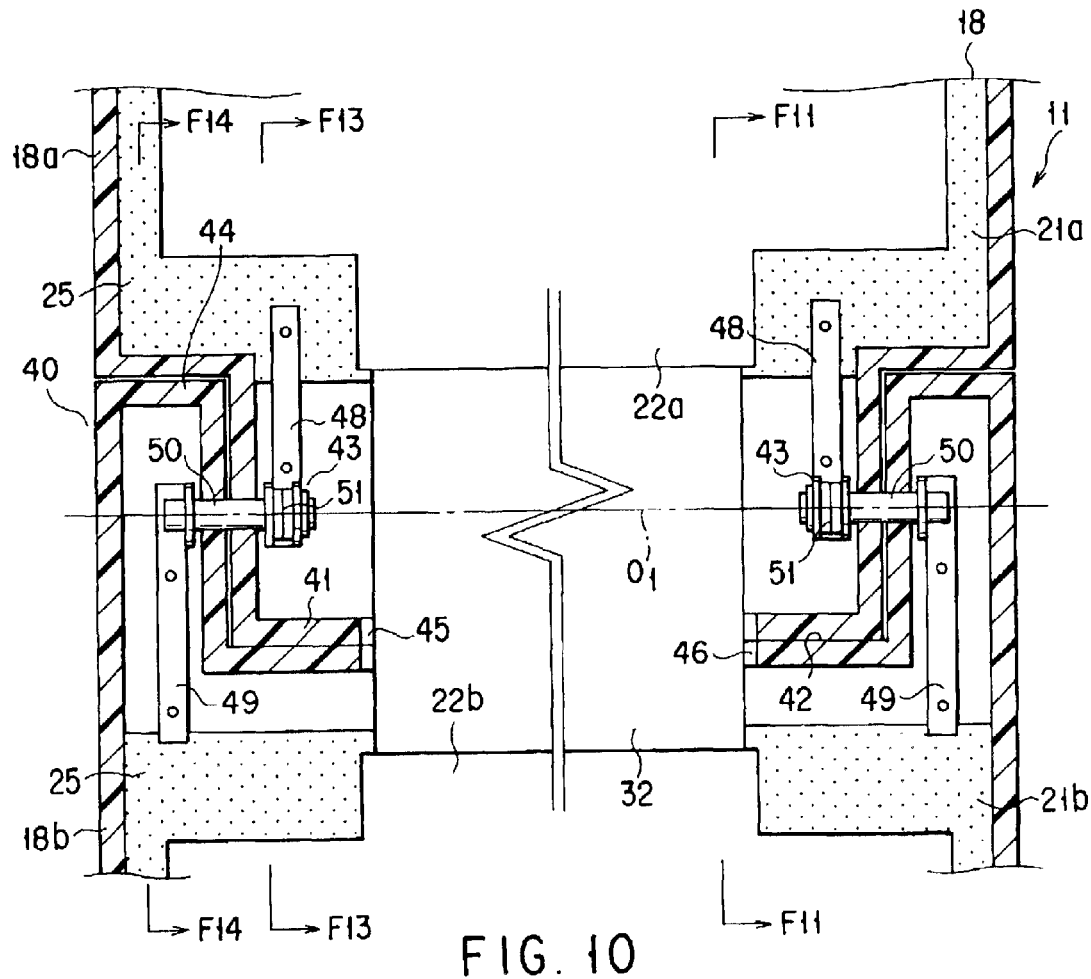
FIG. 10 is an enlarged sectional view illustrating the coupling of the SD card of the second embodiment.
Figure 11:
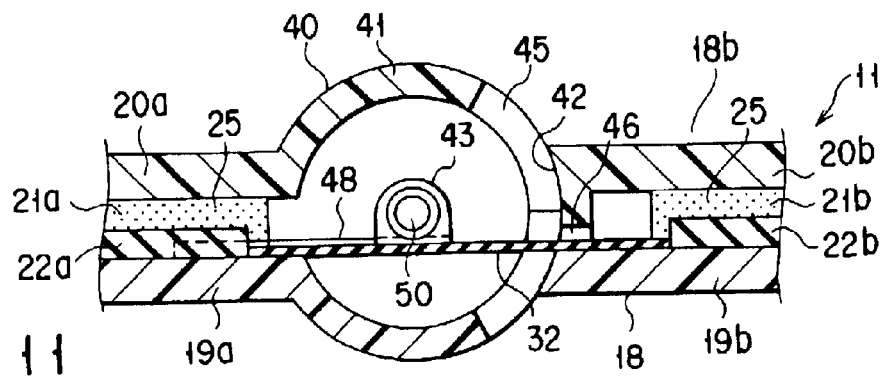
FIG. 11 is a sectional view taken along line F11—F11 of FIG. 10.

As shown in FIGS. 8 to 10, the coupling 40 includes a projection 41 formed in the first portion 18a, recess 42 formed in the second portion 18b and pair of hinge units 43.

Figure 14:
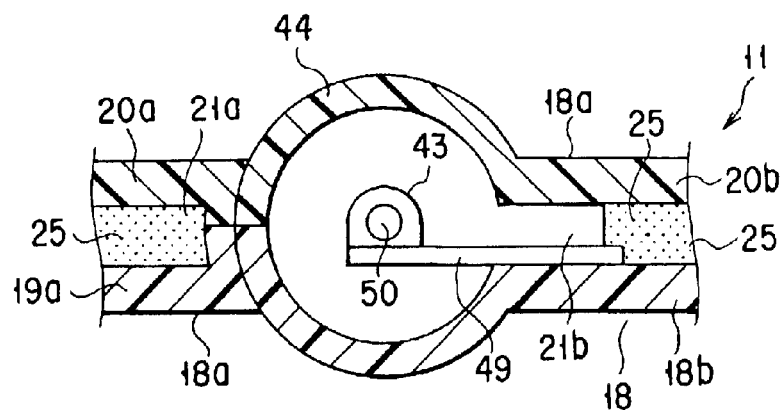
FIG. 14 is a sectional view taken along line F14—F14 of FIG. 10.

As seen from FIGS. 11 to 14, the projection 41 is a hollow cylindrical member extending in the width direction of the card case 18. The projection 41 projects from an end of the first portion 18a to an end of the second portion 18b. The second portion 18b of the card case 18 has a hollow cylindrical end portion 44 as shown in FIG. 14. The cylindrical end portion 44 has the same diameter as the projection 41. The recess 42 is formed in the cylindrical end portion 44. The projection 41 is rotatably fitted in the recess 42. The projection 41 and cylindrical end portion 44 are coaxially located along the axis-of-rotation O1 that extends in the width direction of the card case 18.

Further, the projection 41 has a first opening 45 opening to the recess 42. The recess 42 has a second opening 46 opening to the projection 41. The first and second openings 45 and 46 oppose to and communicate with each other. The flexible wiring board 32 extends through the first and second openings 45 and 46.

The hinge units 43 are separate from each other along the axis-of-rotation O1. Each hinge unit 43 includes first and second brackets 48 and 49 and a hinge shaft 50. The first bracket 48 is secured to the bottom 19a of the first portion 18a. The front end of the first bracket 48 extends into the projection 41. The second bracket 49 is secured to the bottom 19b of the second portion 18b. The front end of the second bracket 49 extends into the cylindrical end portion 44.

The hinge shaft 50 is located coaxially along the axis-of-rotation O1. An end of the hinge shaft 50 is rotatably connected to the front end of the first bracket 48, and the other end is secured to the front end of the second bracket 49. Thus, the first and second portions 18a and 18b of the card case 18 are coupled such that they can pivot about the hinge shafts 50.

A brake mechanism 51 is provided at the connection of each hinge shaft 50 and a corresponding first bracket 48. The brake mechanism 51 limits the rotation of each hinge shaft 50.

Figure 12:
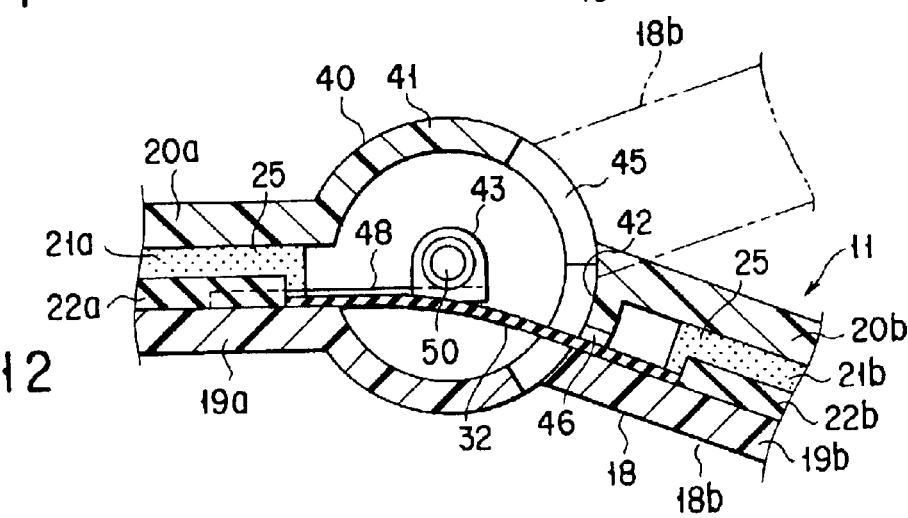
FIG. 12 is a sectional view illustrating the configuration of a flexible wiring board assumed when the second portion is bent in the second embodiment.
Figure 13:
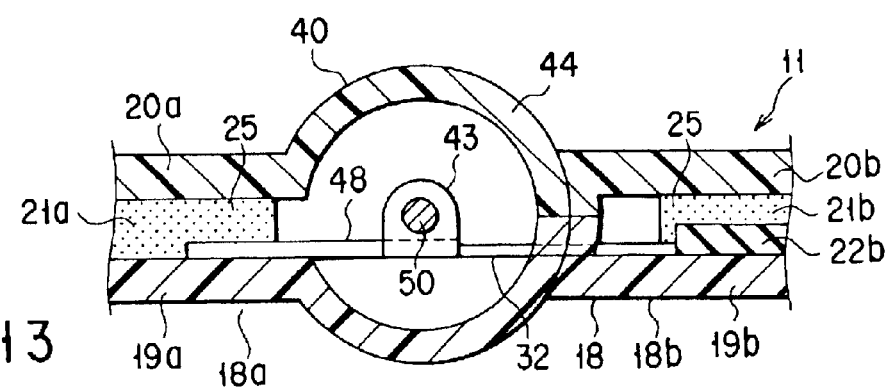
FIG. 13 is a sectional view taken along line F13—F13 of FIG. 10.

In the above-described structure, where the SD card 11 is inserted in the card slot 9 of the portable computer 1, if an external force F is exerted on the second portion 18b of the card case 18 as in the first embodiment, the hinge shafts 50 rotate in accordance with the magnitude and direction of the force F. As a result, as shown in FIG. 12, the coupling 40 is bent, and the second portion 18b of the card case 18 pivots about the hinge shafts 50 in a direction in which the external force F is exerted. This action promptly absorbs the force F applied to the second portion 18b.

Thus, even if an excessive external force F is exerted on the second portion 18b of the card case 18, the stress that occurs in the card case 18 itself, printed wiring boards 22a and 22b and electronic components 23 and 24 can be suppressed. As a result, the SD card 11 exhibits a strong resistance to bending forces, and hence is not easily damaged.

In the second embodiment, the brake mechanism 51 is provided at the connection of each hinge shaft 50 and a corresponding first bracket 48 for limiting the rotation of each hinge shaft 50. Therefore, when the SD card 11 is inserted into or ejected from the card slot 9, the second portion 18b is prevented from rotating, which facilitates the insertion and ejection of the SD card 11.

In addition, in the second embodiment, even after the external force F applied to the second portion 18b to rotate it is released, the brake mechanisms 51 maintain the second portion 18b bent. However, if a torsion coil spring, for example, is used in place of the brake mechanism 51, the second portion 18b can be automatically rotated such that it is level with the first portion 18a, when the external force F is released from the second portion 18b.

Furthermore, the first and second portions of the card case may be coupled by a universal coupling having two axes perpendicular to each other. In this case, an external force F exerted in any direction can be promptly absorbed.

In the invention, the IC card having a radio communication function is not limited to the SD card of a stamp size, but may be, for example, a PC card based on PCMCIA.

Also, the radio communication method is not limited to Bluetooth (trademark), but may be a radio LAN.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card comprising:
 a card case comprising a first portion inserted in a card slot and a second portion projecting from the card slot, the first portion including a printed wiring board provided with an electronic component, and the second portion including a printed wiring board provided with an electronic component;
 a flexible wiring board interposed between the first portion and the second portion, the flexible wiring board electrically connecting the printed wiring board of the first portion and the printed wiring board of the second portion; and
 a bendable coupling which couples the first portion and the second portion,
 wherein the bendable coupling comprises a first elastic block and a second elastic block, the first and second elastic blocks each being structured by a rubber-like elastic material, being fixed so as to lie between the first portion and the second portion, and facing each other in a thickness direction of the card case, and the flexible wiring board being inserted in a gap between the first elastic block and the second elastic block.

2. An IC card according to claim 1, wherein the first and second portions are kept in line by an inherent elastic force of the coupling.

3. An IC card according to claim 1, further comprising a radio communication antenna contained in the second portion.

4. An electronic apparatus comprising:
 a housing having a card slot; and
 an IC card detachably inserted in the card slot of the housing;
 the IC card including:
  a card case comprising a first portion inserted in the card slot and a second portion projecting from the card slot to an outside of the housing, the first portion including a printed wiring board provided with an electronic component, and the second portion including a printed wiring board provided with an electronic component;
  a flexible wiring board interposed between the first portion and the second portion, the flexible wiring board electrically connecting the printed wiring board of the first portion and the printed wiring board of the second portion; and
  a bendable coupling which couples the first portion and the second portion,
  wherein the bendable coupling comprises a first elastic block and a second elastic block, the first and second elastic blocks each being structured by a rubber-like elastic material, being fixed so as to lie between the first portion and the second portion, and facing each other in a thickness direction of the card case, and the flexible wiring board being inserted in a gap between the first elastic block and the second elastic block.

5. An electronic apparatus according to claim 4, wherein the bendable coupling of the IC card is exposed to the outside of the housing through the card slot when the IC card is inserted in the card slot.

6. An electronic apparatus according to claim 4, wherein the second portion of the IC card contains a radio communication antenna.

* * * * *